(12) United States Patent
Parrish

(10) Patent No.: US 12,017,655 B2
(45) Date of Patent: Jun. 25, 2024

(54) UTILITY CART WITH TRAILER HITCH ASSEMBLY

(71) Applicant: Bryan Lee Parrish, Laurens, SC (US)

(72) Inventor: Bryan Lee Parrish, Laurens, SC (US)

(*) Notice: Subject to any disclaimer, the term of this patent is extended or adjusted under 35 U.S.C. 154(b) by 340 days.

(21) Appl. No.: 17/302,148

(22) Filed: Apr. 26, 2021

(65) Prior Publication Data

US 2021/0245764 A1     Aug. 12, 2021

Related U.S. Application Data

(63) Continuation of application No. 16/741,032, filed on Jan. 13, 2020, now Pat. No. 11,511,756.

(51) Int. Cl.
| | |
|---|---|
| *B60W 40/08* | (2012.01) |
| *G01C 21/34* | (2006.01) |
| *G07C 9/00* | (2020.01) |

(52) U.S. Cl.
CPC ......... *B60W 40/08* (2013.01); *G01C 21/3438* (2013.01); *G07C 9/00309* (2013.01); *B60W 2040/0881* (2013.01); *G07C 2009/00388* (2013.01)

(58) Field of Classification Search
CPC ......... B60W 40/08; B60W 2040/0881; G01C 21/3438; G07C 9/00309; G07C 2009/00388
See application file for complete search history.

(56) References Cited

U.S. PATENT DOCUMENTS

| | | |
|---|---|---|
| 3,179,196 A | 4/1965 | Richardson |
| 3,183,013 A | 5/1965 | Brown |
| 3,391,905 A | 7/1968 | Burns |
| 4,168,074 A | 9/1979 | Morris |
| 4,593,883 A | 6/1986 | Nelson |
| 4,799,698 A | 1/1989 | Markovic |
| 4,860,841 A | 8/1989 | Sacco |
| 5,051,056 A | 9/1991 | Gibbons et al. |
| 5,139,102 A * | 8/1992 | Pocapalia .......... B62D 53/0864 180/19.2 |
| 5,259,471 A | 11/1993 | Taylor et al. |
| 6,109,644 A * | 8/2000 | Cox .......... B62B 1/20 280/655 |
| 6,758,291 B1 | 7/2004 | Koch |

(Continued)

*Primary Examiner* — Behrang Badii
*Assistant Examiner* — Jay Khandpur
(74) *Attorney, Agent, or Firm* — Southeast IP Group LLC; Thomas L. Moses

(57) ABSTRACT

A utility cart for maneuvering trailers and trailer accessories includes a base frame member, caster wheels mounted on an underside of the base frame member, a height adjustable hitch assembly, and a pair of handles extending upwardly from the base frame member. The hitch assembly is mounted to the central support members, and includes a vertical post extending upwardly from the support members and a telescoping frame member with a vertical sleeve that mates telescopically with the vertical post. The telescoping frame member includes a height adjustment mechanism that is operated by a hand crank, so that a user can turn the hand crank to raise or lower the height of the telescoping frame member. The utility cart may attach to trailers, trailer hitch accessories, or may be used as a docking station for the recreational vehicle loading and carrying apparatus set forth in U.S. Pat. No. 9,670,013.

19 Claims, 7 Drawing Sheets

(56) References Cited

U.S. PATENT DOCUMENTS

| | | | |
|---|---|---|---|
| 6,824,157 B1* | 11/2004 | Putnam | B60D 1/06 |
| | | | 280/901 |
| 2002/0171224 A1* | 11/2002 | Iles | B60D 1/665 |
| | | | 280/476.1 |
| 2004/0211598 A1* | 10/2004 | Palidis | E21B 7/02 |
| | | | 175/203 |
| 2006/0170193 A1 | 8/2006 | Brown | |
| 2006/0273554 A1* | 12/2006 | Henry | B62B 5/0438 |
| | | | 280/652 |
| 2007/0151776 A1 | 7/2007 | Hart | |
| 2011/0017526 A1 | 1/2011 | Bonnardel | |
| 2014/0062047 A1* | 3/2014 | Van Der Knaap | B62D 21/02 |
| | | | 280/124.109 |
| 2019/0154194 A1* | 5/2019 | Leblanc | F16M 11/10 |
| 2021/0139063 A1* | 5/2021 | Leblanc | B66C 23/18 |

* cited by examiner

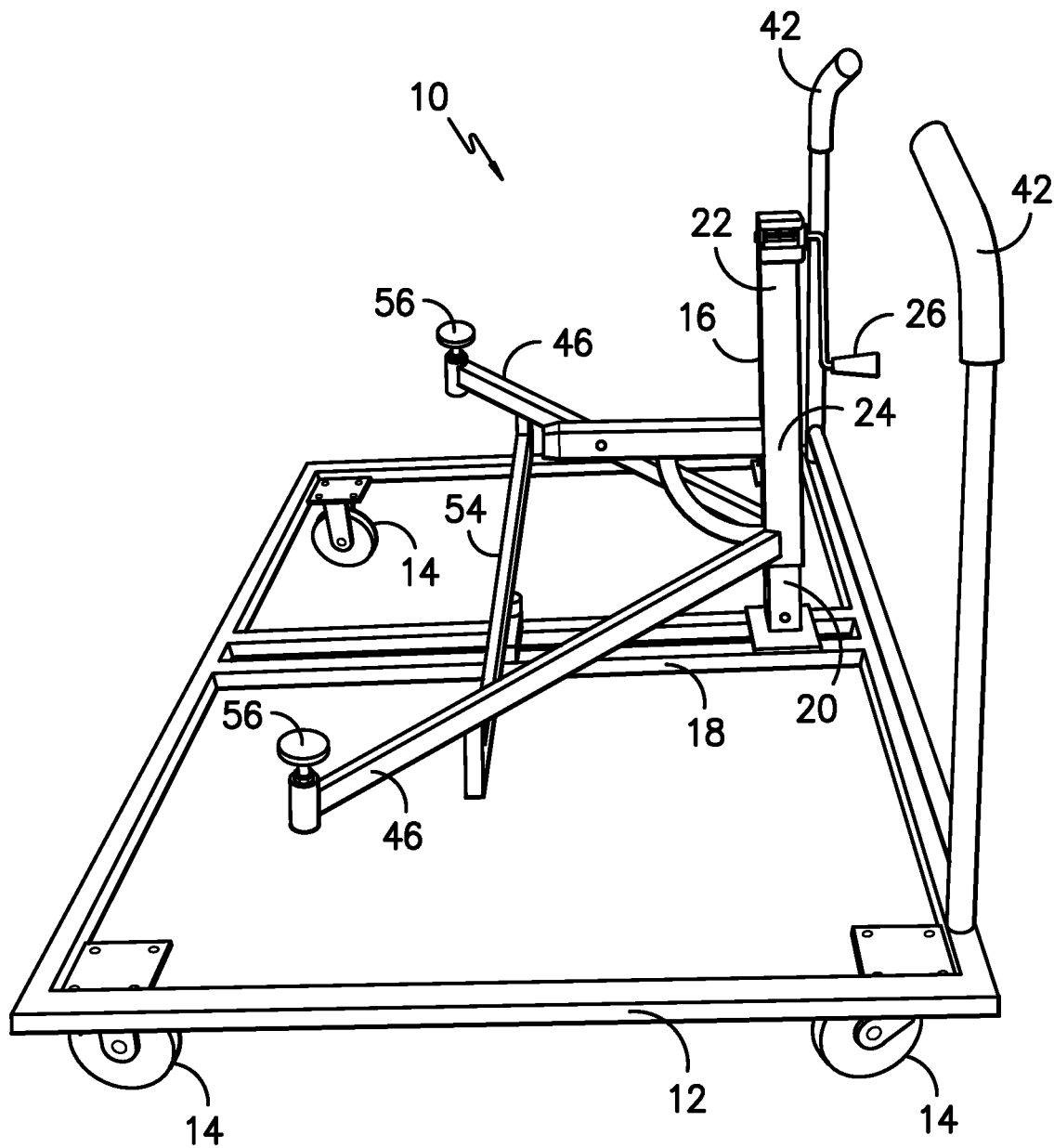
FIG. -1-

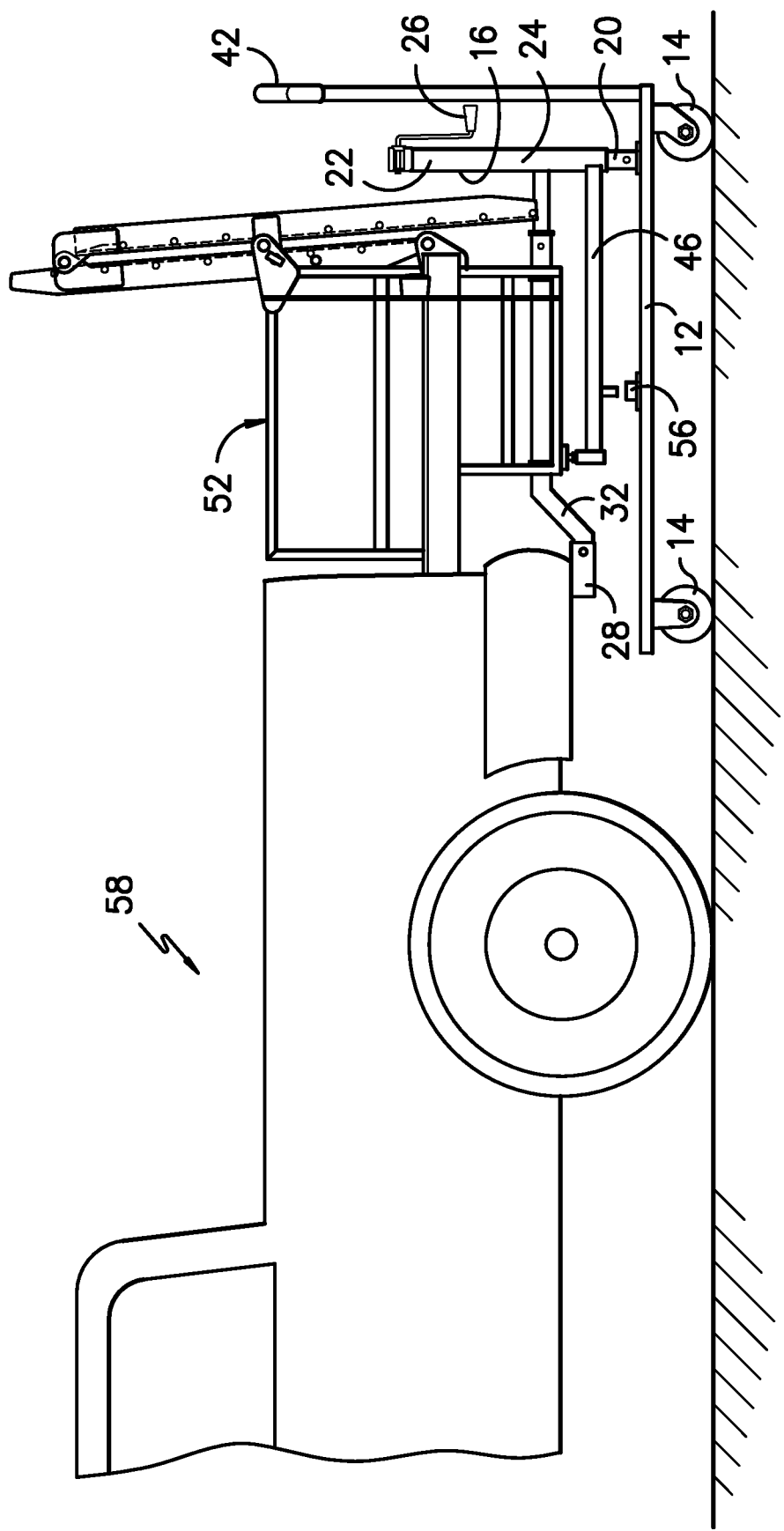
FIG. -2-

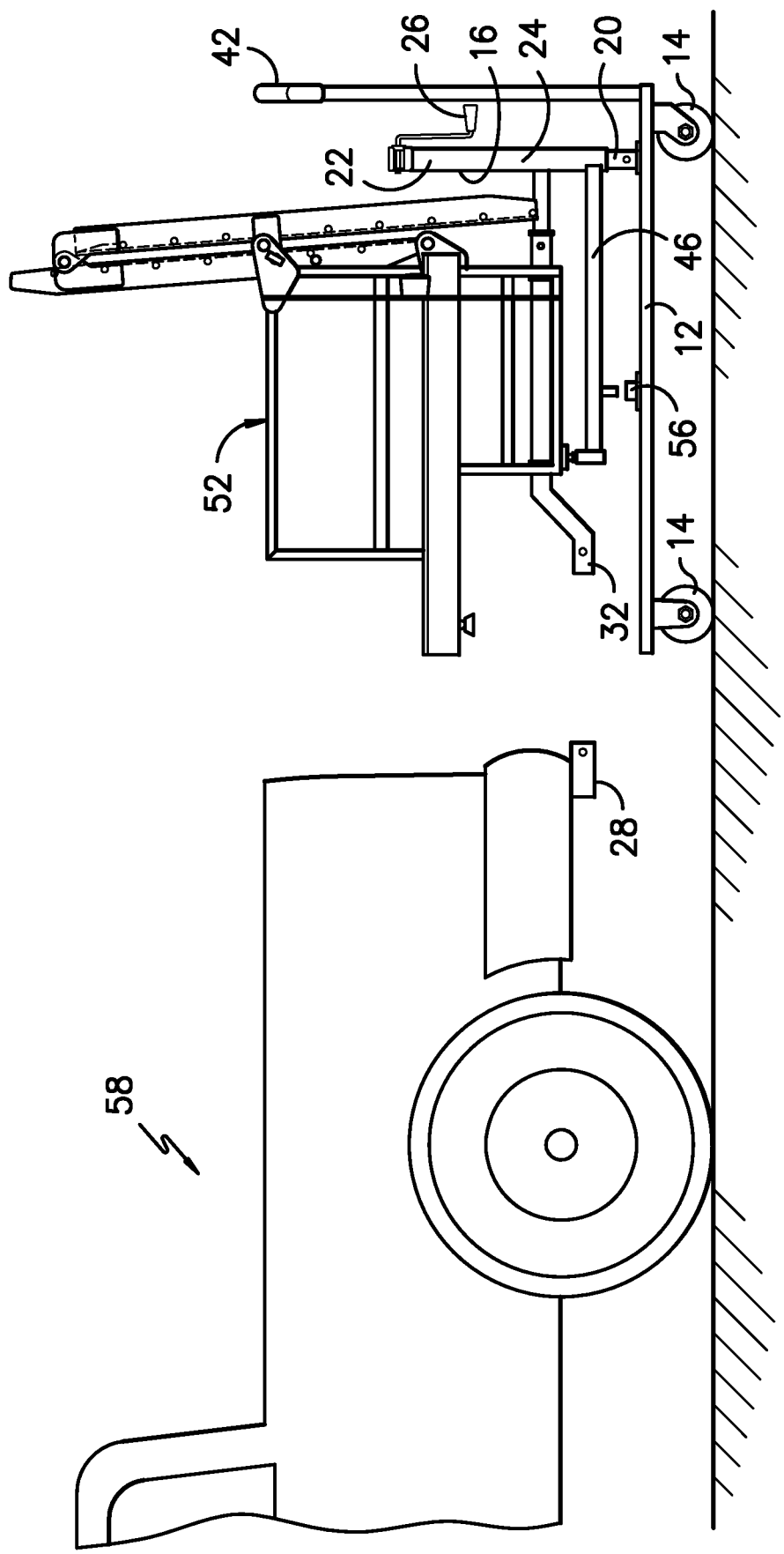
FIG. -3-

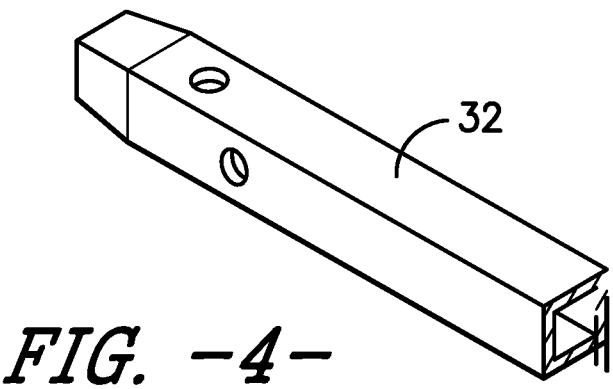
FIG. -4-
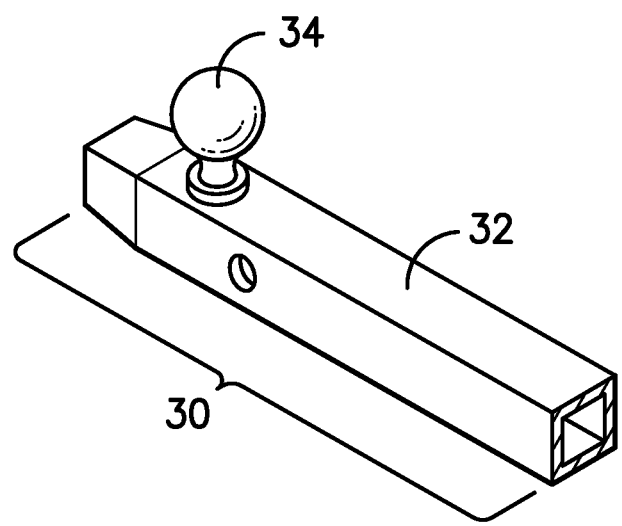
FIG. -5-
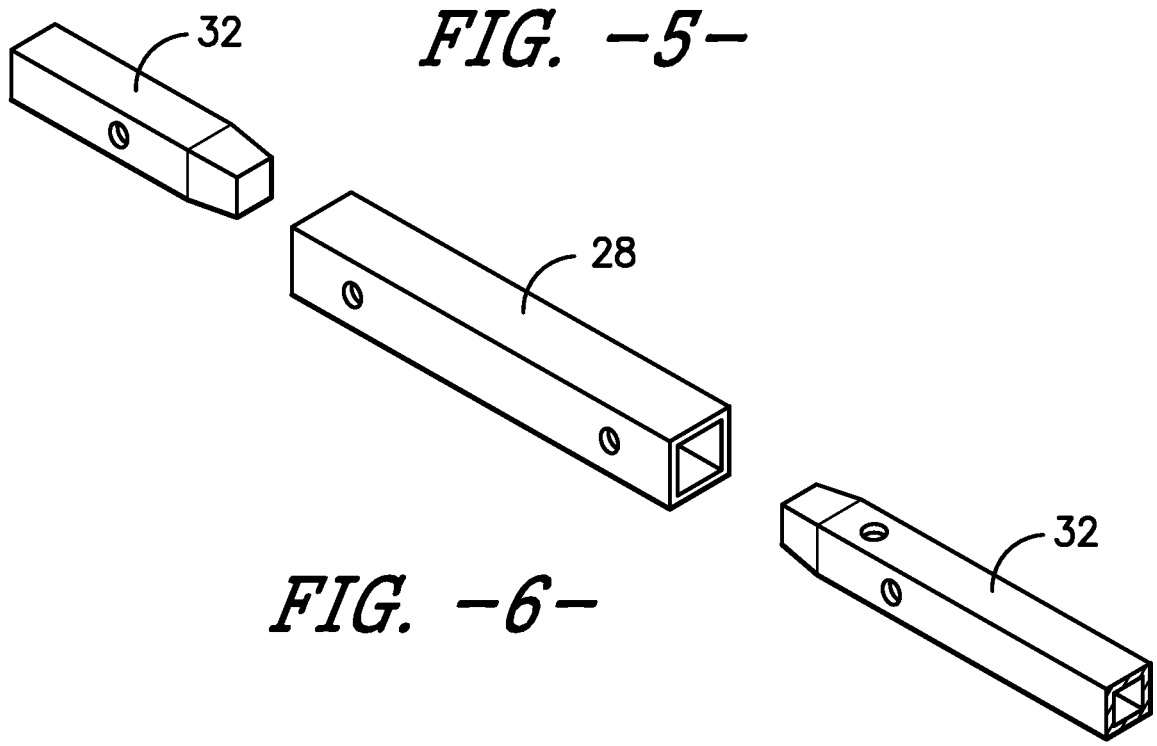
FIG. -6-

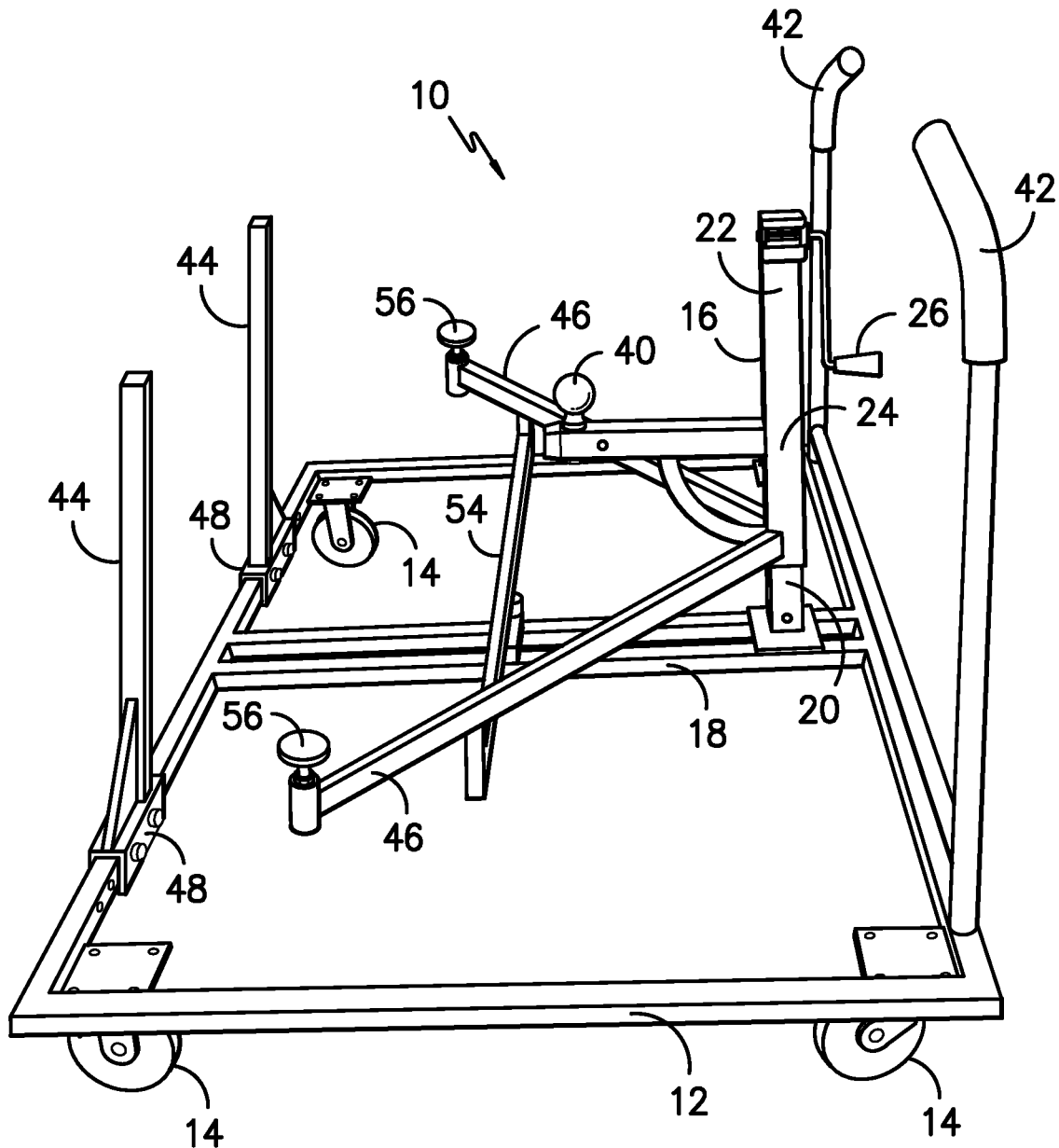
FIG. -7-

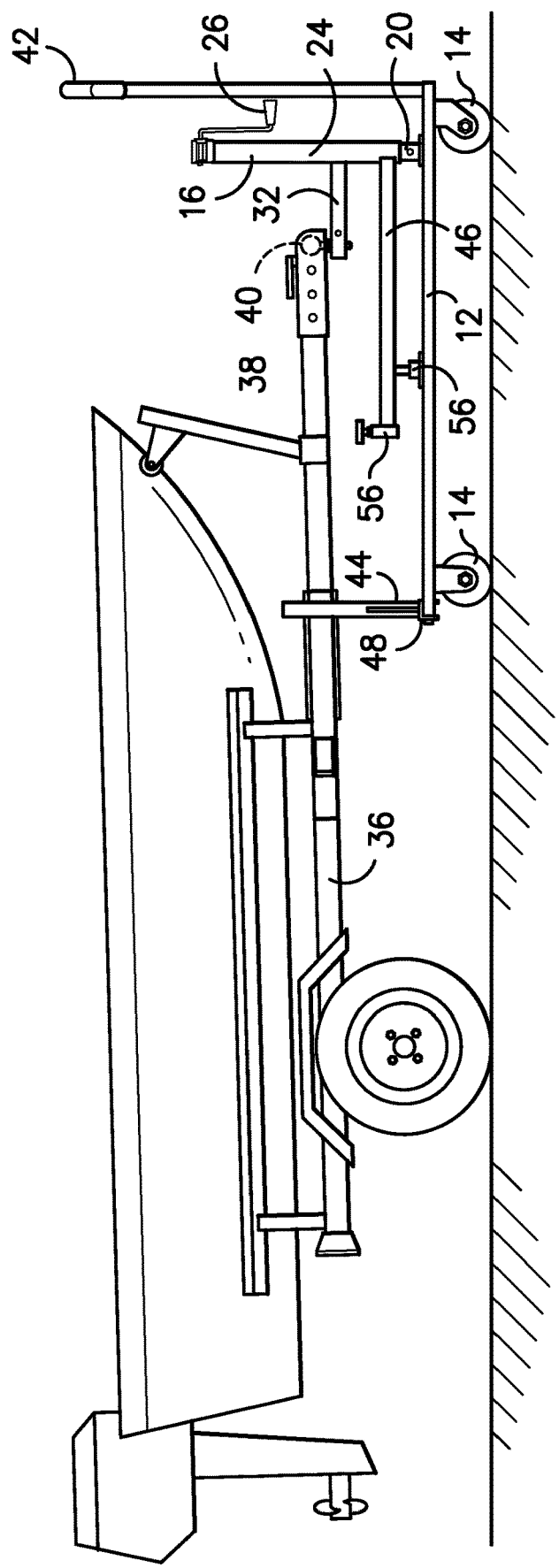
FIG. -8-

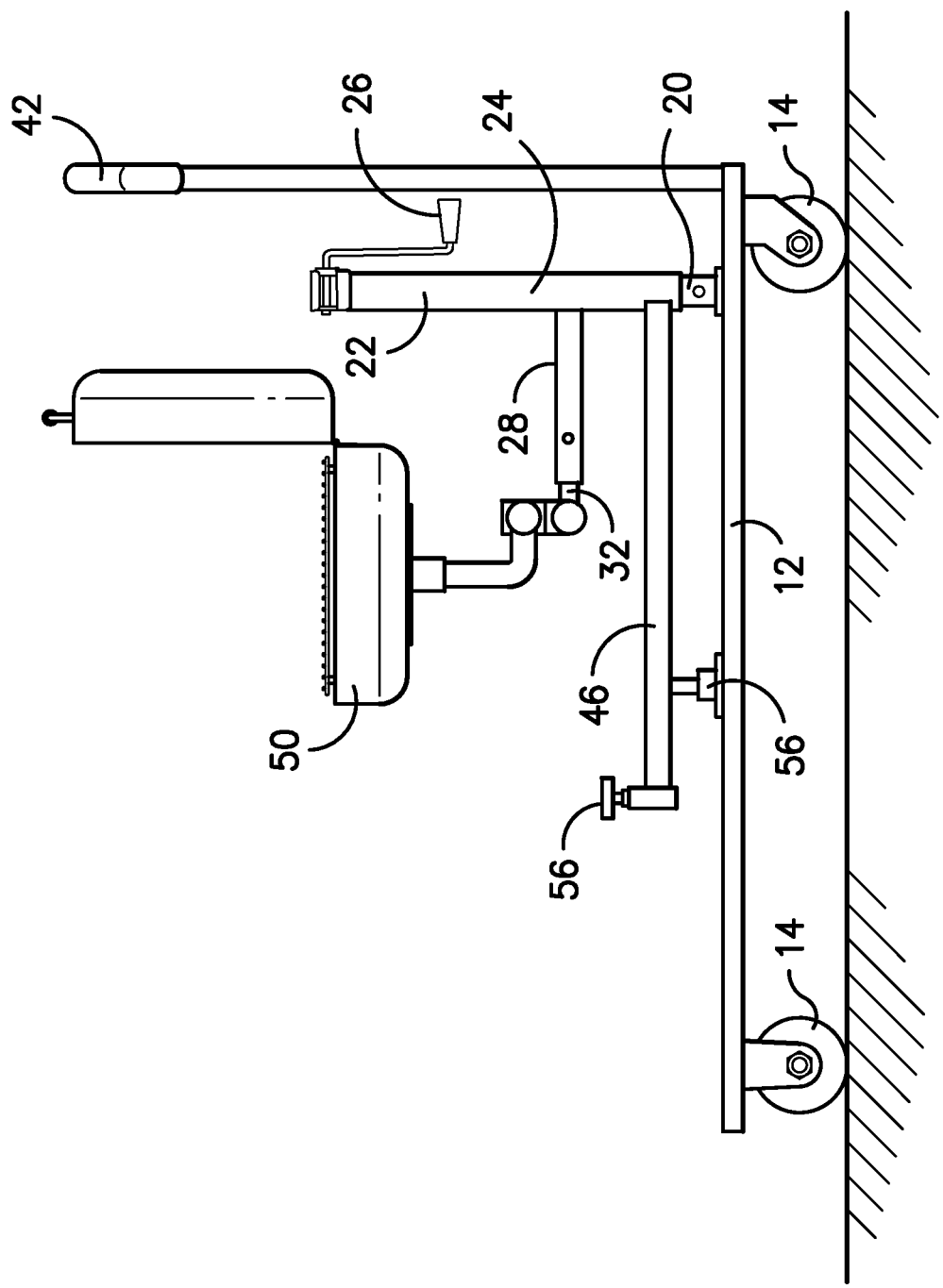
FIG. -9-

UTILITY CART WITH TRAILER HITCH ASSEMBLY

CROSS REFERENCE TO RELATED APPLICATIONS

The present application is a continuation of U.S. application Ser. No. 16/741,032 entitled Utility Cart with Trailer Hitch Assembly, filed on Sep. 25, 2018. All of the foregoing applications are hereby incorporated by reference in their entireties.

BACKGROUND OF THE INVENTION

The present invention relates generally to carts and dollies that attach to trailers and trailer hitch accessories. More specifically, the present invention includes a cart having wheels, further including a hitch receiver for attachment to trailer hitch ball mounts (or other accessories that attach to a hitch receiver) that are commonly found on automobiles, trucks and other vehicles.

In recent years, a number of accessories have been developed for attachment to a vehicle trailer hitch receiver. One very popular trailer hitch design provides a receiver assembly mounted underneath the rear bumper of a car or truck, along with a removable ball mount. The receiver and ball mount each have holes that may be aligned, so that a user may slide a pin through the holes to secure the ball mount to the receiver. However, it has been found that the hitch receiver may be used for attachment other accessories besides a ball mount. Such accessories include umbrellas, grills, storage racks, and even temporary toilet seats, any of which may be attached to the hitch receiver behind a vehicle for tailgating, camping, or the like.

When these accessories are not connected to the hitch receiver on the vehicle, they must be stored somewhere, and these accessories may be large, heavy and cumbersome. Therefore, it would be desirable to provide a convenient storage cart with wheels that also includes a hitch receiver, so that the accessories could be attached thereto and easily moved around a garage or storage facility, for instance.

Additionally, it would be desirable to provide such a cart for attachment to utility trailers, boat trailers, and the like, so that the cart may be used as a dolly and manually pushed around a garage or other storage facility. This arrangement allows a user to push a boat trailer around manually, without having to attach the trailer to a truck or other vehicle, which can be cumbersome and awkward in tight spaces.

Efforts to provide dollies and carts for moving trailers and the like have been developed over the years, with varying degrees of success. The following are examples of such devices, and each of the references cited below are hereby incorporated herein by reference:

U.S. Pat. No. 3,179,196 Trailer Handing Device

This invention relates to new and useful improvements in devices for handling or moving trailers such as house trailers, boat trailers, camping trailers and the like which are ordinarily attached to automobiles or other vehicles by standard hitch devices.

U.S. Pat. No. 3,183,013 Trailer Spotter

This invention relates to a trailer spotter, i.e., a device to facilitate parking of travel trailers, boat trailers, and other such towed vehicles. This application is a continuation-in-part of my pending application filed Sep. 4, 1962, Serial No. 221,383 and now abandoned.

U.S. Pat. No. 4,168,074 Apparatus for Moving Caravans and Other Trailed Vehicles Apparatus for assisting moving of trailed vehicles such as caravans including a jockey wheel supported by an extendible stem adapted to be secured to a forward draft frame of a vehicle, the apparatus being characterized according to this invention in that there is a lever arm secured relative to the jockey wheel in such a way as to control the rotational direction of the jockey wheel and an interengaging gear assembly including a drive shaft with the lever arm arranged so that rotation of the drive shaft will effect rotation of the jockey wheel about its central axis to effect the moving of the trailed vehicle when attached thereto.

U.S. Pat. No. 4,799,698 Auxiliary Support for the Transport of Car Trailers or Truck Trailers An auxiliary support for moving car trailers or truck trailers is supported by wheels on an axle and has a drawbar at its front end. To facilitate connection to a trailer and prevent the auxiliary support from tilting, the auxiliary support is provided with a detachable outrigger that can be connected to the axle at the side opposite the drawbar and has a swivelling wheel.

U.S. Pat. No. 4,860,841 Device for Maneuvering of Trailers

A motorized device for aiding the maneuvering of trailers subsequent to detachment from the towing vehicle is presented which comprises a shaft attachable to the drawbar of the trailer and which is adjustable for height. At least one wheel is mounted at the end of the shaft with the axis of the wheel being perpendicular to the shaft. At least one driving device for driving the when in rotation about its axis and a swivelling device for swivelling the wheel are also provided.

U.S. Pat. No. 5,259,471 Trailer Dolly Apparatus

A trailer dolly arranged for receiving a trailer hitch thereto to permit ease and mobility of a trailer. A support platform includes a forward wheel pivotally mounted relative to the platform, with a plurality of rear wheels, with at least one of the wheels in operative communication with a drive motor. A trailer hitch ball is mounted projecting upwardly of the support platform to receive a trailer hitch thereon. A modification of the invention includes the trailer hitch ball mounted within a cylinder, with a piston reciprocatably mounted within the cylinder mounting the ball at its upper distal end to permit lifting of a trailer as required for its mobility about a support surface.

U.S. Application No. 20060170193 Trailer Dolly

A trailer dolly comprising a horizontal base plate, a first pair of casters which are fixed from rotation about a vertical axis, a second pair of casters being rotatable around a vertical axis, and a trailer ball. The trailer dolly facilitates the loading of a trailer onto a tilt bed tow truck, including: a disabled trailer, such as a trailer with a broken or damaged axle, frozen wheel bearings, or collision damage to a wheel, axle or components thereof and a trailer which is not fitted with a trailer jack having an attached dolly wheel. The trailer hitch ball of the trailer dolly is connected to a receiver of the trailer tongue, providing support, stability, and steerability, and allowing the trailer to be winched onto a tilt bed tow truck without damage to the trailer tongue, a trailer jack, and/or associated mechanism and wiring.

U.S. Application No. 20070151776 Powered Trailer Dolly

A towing dolly is provided for relocating wheeled loads such as boat trailers, camping trailers and airplanes where towing forces required may be substantial. The towing dolly may have a wheel assembly with a drive gear disposed between proximate treads. The towing dolly may have a narrow wheel width providing easy steering and compact size for storage. The towing dolly may have a motor with gear sprocket. A linked chain may transfer power from the motor to the drive gear located between the double treads.

The dolly may have a steering arm extending perpendicular to drive direction allowing the operator to stand away from path of movement of the load while providing adequate leverage to steer the dolly. The dolly may have an alternate configuration with a power source located on the dolly provided operation independent of plugins or extension cords.

U.S. Application No. 20110017526 Object Movement System and Method

Systems and methods for moving objects facilitate quick and inexpensive relocation of the target objects. Operator safety is enhanced by eliminating the need to apply manual force to urge a target object into motion, and by inclusion of features such as automatic braking responsive to motor cut-off. Through use of the present system, a user may move a target object, for example a trailer intended for use behind a vehicle, into and/or out of a storage location in a simplified and more efficient manner.

However, each of the devices disclosed by the references cited above have drawbacks and disadvantages. It would be desirable to provide an inexpensive utility cart that may be attached to trailers and trailer hitch accessories for manual transport and storage. Further, it would be desirable to provide such a cart that includes a height adjustment for the hitch receiver, and one that includes a wide stance for supporting heavy accessories when they are not attached to the rear hitch receiver on a vehicle.

BRIEF SUMMARY OF THE INVENTION

In accordance with one aspect of the invention, a first embodiment of a utility cart includes a base frame member, caster wheels mounted on an underside of the base frame member, a height adjustable hitch assembly, and a pair of handles extending upwardly from the base frame member. The base frame member is generally rectangular shaped in a preferred embodiment, and may include central support members across a central portion thereof. The hitch assembly is mounted to the central support members, and includes a vertical post extending upwardly from the support members and a telescoping frame member with a vertical sleeve that mates telescopically with the vertical post. The telescoping frame member includes a height adjustment mechanism that is operated by a hand crank, so that a user can turn the hand crank to raise or lower the height of the telescoping frame member In one embodiment, the utility cart may be adapted to be a docking station for the recreational vehicle loading and carrying apparatus (hereinafter referred to as the "RVLCA") set forth in U.S. Pat. No. 9,670,013, which is incorporated herein by reference. In this embodiment, the telescoping frame member includes a pair of diagonal supports having a cross support therebetween to carry the RVLCA while it is attached to the utility cart.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of the present invention, showing a utility cart having a height adjustable trailer hitch assembly disposed on a base frame member, and including wheels and handles for manual transport;

FIG. 2 is a side view of one embodiment of the present invention, showing a pickup truck having a "recreational vehicle loading and carrying apparatus ("RVLCA") attached thereto, and a utility cart attached to a rear portion of the RVLCA;

FIG. 3 is a side view of the embodiment of the present invention shown in FIG. 2, wherein the RVLCA is separated from the truck while attached to the utility cart;

FIG. 4 is a perspective view of one embodiment of an extension arm having a hole in an upper and lower portion for receiving a trailer hitch ball;

FIG. 5 is a perspective view of the extension arm shown in FIG. 4, wherein a trailer hitch ball has been attached thereto;

FIG. 6 is a perspective view of one embodiment of a hitch receiver adapter having a female end on both ends thereof for receiving extension arms of a utility cart on one end, and a trailer hitch assembly, such as a grill, table, or umbrella, on the other end;

FIG. 7 is a perspective view of one embodiment of the present invention, showing a utility cart having a ball mount with a trailer hitch ball attached, and showing a pair of adjustable vertical alignment posts attached to the base frame member;

FIG. 8 is a side view of the embodiment of the present invention shown in FIG. 7, wherein the utility cart is attached to a boat trailer, and the vertical alignment posts are in use to maintain alignment between the utility cart and the trailer to prevent a jack-knifing effect; and FIG. 9 is a side view of one embodiment of the present invention showing a utility car having a trailer hitch accessory grill attached thereto for manual transport and/or storage.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention includes, in a first embodiment, a utility cart 10 having a base frame member 12, caster wheels 14 mounted on an underside of the base frame member 12, a height adjustable hitch assembly 16, and a pair of handles 42 extending upwardly from the base frame member 12, as shown in FIG. 1. The base frame member 12 is generally rectangular shaped in a preferred embodiment, and may include central support members 18 across a central portion thereof. The hitch assembly 16 is mounted to the central support members 18, and includes a vertical post 20 extending upwardly from the central support members 18 and a telescoping frame member 22 with a vertical sleeve 24 that makes telescopically with the vertical post 20. The telescoping frame member 22 includes a height adjustment mechanism that is operated by a hand crank 26, so that a user can turn the hand crank 26 to raise or lower the height of the telescoping frame member 22. Additionally, in one embodiment, the hitch assembly 16 includes a trailer hitch receiver 28, which is essentially a sleeve for accepting a ball mount 30 that slides telescopically into the receiver 28 and is secured there by a pin extending between aligned holes in the receiver 28 and the ball mount 30.

The ball mount 30 includes an extension arm 32 and a trailer hitch ball 34 secured at or near a distal end thereof, as shown in FIGS. 4 and 5. When the ball mount 30 is secured within the receiver 28, a trailer 36 may be removably attached to the trailer hitch ball 34, as shown in FIG. 7.

In use, the cart 10 is wheeled by a user and oriented so that the trailer hitch ball 34 is adjacent the tongue 38 of the trailer 36 that includes the trailer hitch (ball receiver) 40. The height of the trailer hitch receiver assembly 16 (and the ball 34, when attached thereto) may be adjusted upwardly or downwardly as desired by rotating the hand crank 26 in either a clockwise or counterclockwise direction. The trailer hitch 40 is affixed to the ball 24, in the traditional manner that is well known in the art, so that the trailer 36 is now secured to the cart 10. This arrangement allows a user to grasp the handles 42 of the cart 10 and push it in any desired direction, along with the trailer 36. The utility cart 10 is much more maneuverable than a vehicle, which facilitates moving the trailer 36 around manually, particularly in tight spaces, such as a garage, storage shed, or the like.

In one embodiment, a pair of vertical alignment posts 44 may be adjustably affixed to the utility cart 10, either on the base frame member 12 or on the diagonal supports 46 of the hitch assembly 16, in order to secure the trailer 36 into a straight-line orientation with respect to the utility cart 10. One example is shown in FIGS. 2 and 3, wherein the vertical alignment posts 44 are temporarily affixed to the base frame member 12 so that each post comes into contact with an outer portion of the trailer 36, so that the trailer 36 cannot pivot with respect to the utility cart 10. Rubber pads or other types of padding may be affixed to the vertical alignment posts 44, to prevent scratching and abrasion where the vertical alignment posts 44 come into contact with the trailer 36. The vertical alignment posts 44 are adjustable with respect to their placement along the base frame member 12, so that the posts 44 may be moved to accommodate trailers 36 of different sizes and shapes. In one embodiment, as shown in FIG. 7, there are a series of holes disposed along the base frame member 12, and U-shaped brackets 48 may be used to temporarily affix the vertical alignment posts 44 at the desired points on the base frame member 12, so that the vertical alignment posts 44 are properly positioned to keep the trailer 36 in alignment with the cart 10 to prevent a jack-knifing effect. It should be understood that other suitable mechanisms and means may be used to temporarily affix the vertical alignment posts 44 in the desired position on the base frame member 12 or the hitch assembly 16, in order to accomplish this purpose.

Similarly, the cart 10 may be used to attach and store accessories that mate with a standard trailer hitch receiver 28. For instance, umbrellas, grills 50, seats and the like are made to slide into the receiver 28. These accessories may also be attached to the utility cart 10 in a similar manner as described above, and may be maneuvered and stored in this way, as shown in FIG. 8, which shows a grill 50 attached to the cart 10 for manual transport and/or storage.

In one embodiment, the utility cart 10 may be adapted to be used as a docking station for the recreational vehicle loading and carrying apparatus 52 (hereinafter referred to as the "RVLCA") set forth in U.S. Pat. No. 9,670,013, which is incorporated herein by reference. In this embodiment, the telescoping frame member 22 includes a pair of diagonal supports 46 having a cross support 54 therebetween to carry the RVLCA 52 while it is attached to the utility cart 10. Preferably, rubber or foam pads 56 are disposed on an upper portion of the distal ends of the diagonal support members 46 to support the RVLCA 52 (or any other trailer hitch accessory). Additionally, in this embodiment, the hitch assembly 16 preferably includes an extension arm 32 that slides into a standard hitch receiver 28, and includes holes on either side of the extension arm 32, which may be aligned with holes on a hitch receiver 28 so that a pin may slide through the aligned holes to secure the extension arm 32 to the hitch receiver 28. As with traditional receiver/ball mount arrangements, a clip is affixed through a hole in one end of the pin to prevent the pin from sliding out of the aligned holes, and arrangement that is commonly known and ubiquitous in the trailer hitch industry.

Similarly to the method described above for attachment to a trailer 36, the utility cart 10 may be wheeled to the rear side of the RVLCA 52 while the RVLCA 52 is attached to the rear portion of a truck 58, as shown in FIG. 2. The height of the telescoping frame member 22 is adjusted so that the extension arm 32 is aligned with the hitch receiver 28 on the rear side of the RVLCA 52, and is then inserted therein and secured thereto. Then, the RVLCA 52 may be detached from the hitch receiver 28 attached to the vehicle 58, so that the utility cart 10 may be wheeled away with the RVLCA 52 attached thereto, as shown in FIG. 3.

The extension arm 32 of this embodiment may also include a vertically oriented hole in a distal end thereof, so that a ball 34 may be mounted on an upper portion thereof for attachment to a standard trailer hitch.

In an alternate embodiment, the utility cart 10 may include a hitch receiver 28 instead of an extension arm 32, and an independent extension arm 32 may slide into both the hitch receivers 28 of the utility cart and the RVLCA 52 and secured using the above-described pins, or any other suitable securement means, as is well known in the art, and described in several references that are incorporated herein.

Optionally, a hitch receiver adapter may be used to attach the extension arm of the utility cart to another extension arm of a trailer accessory, so that the hitch receiver adapter includes female ends at a first end and a second end. This arrangement is shown in FIG. 6.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A utility cart comprising:
a base frame member having at least four wheels positioned on an underside thereof, wherein each of said wheels are attached to said base frame member in a fixed vertical position with respect to said base frame member, and wherein each of said wheels each spin freely, independently of one another;
a height adjustable hitch assembly comprising a vertically oriented post attached to said base frame member, a generally hollow telescoping frame member that telescopically mates with said vertically oriented post, so that said telescoping frame member may be adjusted upwardly or downwardly in a vertical direction;
wherein said height adjustable hitch assembly includes a pair of diagonal supports extending outwardly from said telescoping frame member in a horizontal plane so that said pair of diagonal supports move upwardly and downwardly along with said height adjustable hitch assembly; and at least one handle member attached to said base frame member so that the cart may be manually rolled on said free-spinning wheels and moved by a user.

2. The utility cart set forth in claim 1, wherein said height adjustable hitch assembly includes a generally horizontal extension arm that is adapted to be received by and temporarily secured to a trailer hitch receiver.

3. The utility cart set forth in claim 2, further including a trailer hitch ball positioned on a distal end of said horizontal extension arm.

4. The utility cart set forth in claim 3, wherein said trailer hitch ball is removable from said horizontal extension arm.

5. The utility cart set forth in claim 1, wherein said height adjustable hitch assembly includes a generally horizontal hitch receiver attached to said telescoping frame member.

6. The utility cart set forth in claim 1, wherein said wheels are caster wheels that may spin in a 360 degree arc.

7. The utility cart set forth in claim 1, further including a second handle member attached to said base frame member.

8. The utility cart set forth in claim 1, further including a hand crank operatively connected to said hitch assembly for raising and lowering said telescoping frame member.

9. The utility cart set forth in claim 1, wherein said height adjustable hitch assembly includes a hitch receiver oriented in a generally horizontal orientation.

10. The utility cart set forth in claim 2, further including a hitch receiver adapter attached to a distal end of said extension arm.

11. The utility cart set forth in claim 3, further including a pair of vertical alignment posts attached to said base frame member.

12. The utility cart set forth in claim 11, wherein said vertical alignment posts are removable from said base frame member.

13. The utility cart set forth in claim 11, wherein said vertical alignment posts are adjustable with respect to said base frame member, and may be positioned on said base frame member or repositioned on said base frame member as desired by a user.

14. A method of using a utility cart, said method comprising the steps of:

providing a utility cart, wherein said cart includes a base member having a plurality of wheels that rotate independently from one another, wherein said wheels are attached to an underside of said base member in a fixed vertical position with respect to said base member, and at least one handle member operatively connected to said base member;

providing a height adjustable trailer hitch assembly and ball mount that is attached to said base member;

providing a pair of diagonal supports extending outwardly from said telescoping frame member, so that said pair of diagonal supports move upwardly and downwardly along with said height adjustable trailer hitch assembly and ball mount;

providing an item having a trailer tongue assembly for attachment to a trailer hitch ball;

attaching said item to said utility cart by temporarily connecting said trailer hitch ball to said trailer tongue assembly, so that said utility cart may be manually rolled on said independently rotating wheels to maneuver said item into a desired position.

15. The method of using a utility cart set forth in claim 14, wherein:

said height adjustable trailer hitch assembly comprises a vertically oriented post attached to said utility cart in a vertically telescoping manner, and said horizontally oriented ball mount attached to said vertically oriented post.

16. The method of using a utility cart set forth in claim 15, further including the step of:

providing a hand crank for adjusting said telescoping frame member in a vertical direction.

17. A method of using a utility cart, said method comprising the steps of:

providing a utility cart, wherein said cart includes a base member having a plurality of wheels that rotate independently of one another, wherein said wheels are attached to an underside of said base member in a fixed vertical position with respect to said base member, and at least one handle member;

providing a height adjustable trailer hitch receiver sleeve assembly that is attached to said base member;

providing an item having an extension member that may be temporarily received by and secured to said trailer hitch receiver sleeve;

attaching said item to said utility cart by temporarily connecting said extension member to said trailer hitch receiver sleeve, so that said utility cart may be manually rolled on said independently rotating wheels to maneuver said item into a desired position.

18. The method of using a utility cart set forth in claim 17, wherein:

at least one of said wheels is a castor wheel that spins in a 360 degree arc.

19. The method of using a utility cart set forth in claim 17, wherein:

said height adjustable trailer hitch receiver comprises a vertically oriented post attached to said utility cart in a vertically telescoping manner.

\* \* \* \* \*